United States Patent [19]
Shono

[11] 3,724,344
[45] Apr. 3, 1973

[54] CAMERA FLASHGUN SHOE
[75] Inventor: Tetsuji Shono, Tokyo, Japan
[73] Assignee: Asahi Kogaku Kogyo Kabushiki Kaisha, Tokyo-to, Japan
[22] Filed: Aug. 2, 1971
[21] Appl. No.: 167,989

[30] Foreign Application Priority Data

Aug. 3, 1970 Japan..................................45/76685
Aug. 3, 1970 Japan..................................45/76686

[52] U.S. Cl.................95/11 L, 95/11 R, 95/11.5 R, 240/1.3
[51] Int. Cl.........................G03b 9/70, G03b 15/02
[58] Field of Search..............95/11 R, 11 L, 11.5 R; 240/1.3

[56] References Cited

UNITED STATES PATENTS

| 3,355,559 | 11/1967 | Hahn et al.................95/11.5 R X |
| 3,286,612 | 11/1966 | Lieser..........................95/11 R |
| 3,406,619 | 10/1968 | Rentschler.................95/11 R X |
| 3,463,069 | 8/1969 | Kremp et al.................240/1.3 X |

Primary Examiner—Robert P. Greiner
Attorney—D. Bruce Prout et al.

[57] ABSTRACT

A "hot shoe" accessory for a camera provides for the elimination of electrical shocks to the user. The accessory includes a synchronizing contact supported adjacent to an aperture in the shoe. A two-terminal switching device is connected in series circuit relationship between the synchronizing contact and a terminal of the conventional female PC connectors provided as a standard feature on the camera body. The two-terminal switching device is a unilaterally conductive circuit element which blocks current transmission from the PC connector to the shoe and thereby prevents electrical shocks to the user but which conducts current in the opposite direction during flash operation.

3 Claims, 2 Drawing Figures

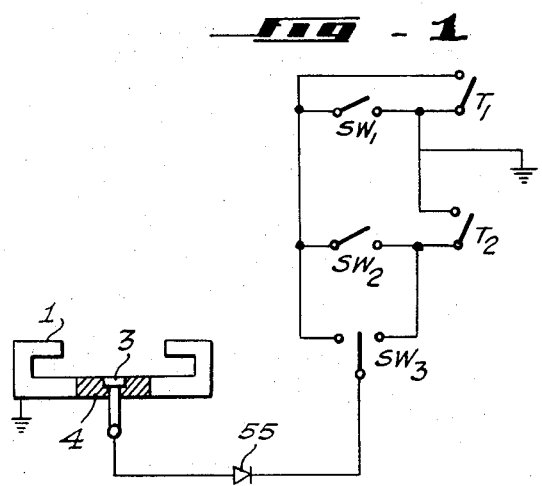

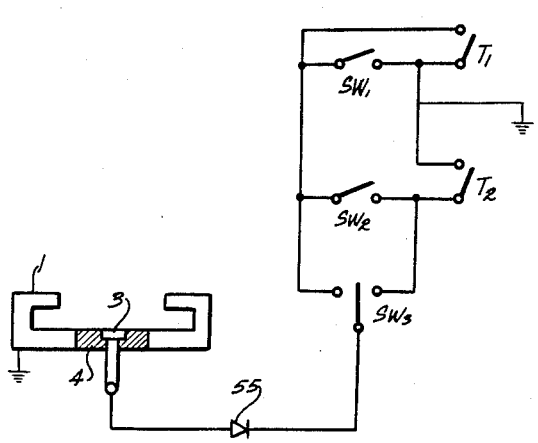

CAMERA FLASHGUN SHOE

BACKGROUND OF THE INVENTION

1. Field of the Invention

This invention relates to camera accessories and particularly to an arrangement for preventing electrical shocks upon touching a flashgun shoe.

2. Description of the Prior Art

The conventional hot shoe or flashgun mounting seat for a camera creates a hazard of electrical shock to the user. This hazard develops when a flashgun accessory of the type using conventional PC connectors is connected to one of the terminal seats provided as a standard feature on most camera bodies. A relatively high voltage developed internally in the connected flashgun accessory is transmitted through internal wiring in the camera up to a synchronizing contact of the hot shoe. While the synchronizing contact is exposed, the camera user will get a shock when he touches it.

Various approaches have been taken to eliminate this shock hazard. For example, a removable plastic cover is often provided to cover the synchronizing contact; however, such covers are a nuisance to handle because they must be removed each time a flashgun accessory is inserted into the shoe. Furthermore, since they are removable they are easily lost. Mechanical switches have also been used to disconnect the power from the exposed contact. However, they suffer from the disadvantages normally attendant mechanical switching devices.

SUMMARY OF THE INVENTION

The present invention provides for the elimination of electrical shock to the user of a camera by means of a unilaterally conductive switching device connected to the synchronizing terminal of the shoe.

In a preferred embodiment the invention includes a shoe adapted to be mounted on the camera. This shoe has an aperture and a synchronizing contact is supported adjacent to the aperture. A synchronizing switching mechanism provided is a standard feature in most commercially available current cameras. A unilaterally conductive circuit element is connected in series circuit relationship between the synchronizing contact and the synchronizing switching mechanism. The unilaterally conductive circuit element is operative to conduct in one direction upon closure of the camera's internal synchronizing switching mechanism but blocks current transmission in the opposite direction so as to eliminate the shock hazard.

Such commercially available cameras generally have a pair of receptacles for receiving standard PC connectors. An internal switch within the camera closes automatically before the shutter opens so as to actuate a flashbulb type of gun. Another internal switch within the camera closes as the shutter opens so as to actuate an electronic flash type of gun. A manually operated, single pole, two-position switch is provided for connecting either one of the internal switches in series circuit relationship with the synchronizing terminal of the shoe.

BRIEF DESCRIPTION OF THE DRAWINGS

FIG. 1 is a perspective view showing a shoe or accessory mounting seat and an associated synchronizing contact; and FIG. 2 is a circuit diagram illustrating an embodiment of the present invention using a unilaterally conductive circuit element in series circuit relationship with an associated synchronizing switching mechanism.

DETAILED DESCRIPTION

In FIG. 1 a normally open, single pole, two-terminal switch SW1 is connected across the two terminals of a synchro terminal connector or seat T1. Switch SW1 is adapted to be closed upon upward movement of mirror in a single-lens reflex camera and opened upon downward movement thereof. By convention, synchro terminal T1 is called an FP terminal and is intended for use in connection with flashbulb type guns.

A normally open, single pole, two-terminal switch SW2 is adapted to be closed in operative association with the leading screen of a focal plane shutter and opened upon shutter charge. The poles of the switches SW1 and SW2 are electrically connected together.

A synchro terminal seat T2 has two terminals, the first being electrically connected to the normally open contact of the switch SW2. By convention the synchro terminal T2 is called an X terminal and is intended for use in connection with electronic flash type guns. The two terminals of the seat T2 are shorted together while the switches SW1 and SW2 are closed simultaneously.

A manually operated single pole, two-position selection switch SW3 is provided for manual selection of either flashbulb type synchronization or electronic flash type of synchronization.

A synchronizing contact 3 is provided for a shoe. A unilaterally conductive element 55, preferably in the form of a diode is connected in series circuit relationship between synchronizing contact 3 and the pole of the selection switch SW3. The element 55 is connected in the circuit so that it prevents any high voltages reverse biasing to the diode applied to either the seat T1 or T2 from reaching the synchronizing contact 3 and thereby eliminates the shock hazard. After the accessory is mounted on the shoe, switch SW4 is closed and the accessory can be synchronized by the closure of either the switch SW1 or SW2 as determined by the position of the selection switch SW3.

Supposing that the selection switch SW3 is closed so as to connect to either of the terminals (especially to connect to the terminal T2) and the trigger cord of the flashing apparatus is attached to the terminal T2 or T1 without the pc connector (this case is most usual for actual use of a flashing apparatus), the trigger cord, i.e. the terminal T2 or T1 connected to the cord, is energized by direct current voltage from the power source included in the flashing apparatus, when the flashing apparatus has been completely prepared for flashing. The voltage energizing the trigger cord includes extremely high voltage (about 200v) generated at the X contact T2. Accordingly, unless the diode 55 is arranged in the circuit, a finger that mistakenly touches the terminal 3 will receive an electric shock. According to our invention, as the diode 55 prevents the flow of electricity to the terminal 3, there is no fear of electric shock, even when the terminal T2 or T1 is energized with direct current voltage.

Refer now to FIGS. 2 and 3. An elongated shoe 1 is fixed on a base mounting seat 4 made of insulating material such as plastic. The base seat 4 has a configuration adapted to fit over a penta-prism mount on a conventional single-lens reflex camera. The shoe 1 in transverse cross section is shaped like an upwardly opening U with inwardly turned marginal lips on each of the opposite legs of the U. A mounting seat cover 2 has a keyhole shaped slot providing an opening. The synchronizing contact 3 is exposed by the opening and is surrounded by insulating material as part of the base seat 4.

When fitting leg member (not shown) of an accessory, having a generally upside down T-shape, is slided into the accessory mounting seat or shoe 1, a connecting member of the fitting leg member is urged against the synchronizing contact 3. Thus the synchronizing contact 3 is placed in series circuit relationship with either terminal T1 or terminal T2 in accordance with the position of a manual selection switch SW3 which is preferably mounted on the exterior of the camera body and is accessible for manual operation.

The shoe 1 provides for mounting of a flashgun accessory. Certain commercially available flashgun acessories are adapted for what is called "hot shoe" operation. Such flash accessories are equipped with an upside-down T shaped electrically conductive mounting bracket and an electrically conductive pin projecting downwardly from the bracket. A source of relatively high voltage internal to the accessory causes the conductive pin to have a positive voltage relative to the bracket.

When using an electronic flash type of device in a hot shoe mode the user moves the selection switch SW3 so as to connect the cathode end of diode 55 to the normally open contact of switch SW2. When a picture is taken, the switch SW1 closes upon upward movement of the mirror in the single-lens reflex camera and the switch SW2 closes in operative association with the leading screen of the focal plane shutter. With the switches SW1 and SW2 closed, current is conducted through the synchronizing contact 3, the diode 55, the switch SW2, and the switch SW1 and the electronic flash is activated.

When using other than electronic flash type devices in hot shoe mode, the user moves the selection switch SW3 so as to connect the cathode end of the diode 55 to the commonly connected poles of the switches SW1 and SW2. When a picture is taken, the closure of switch SW1 completes an electrical circuit path and the flash is activated.

When a flash device having an internal source of voltage is connected to either the seat T1 or T2, the commonly connected poles of the switches SW1 and SW2 are raised to a relatively high positive voltage relative to the terminals shown connected to ground. The diode 55 prevents this positive voltage from reaching the synchronizing contact 3 by virtue of its rectifying property and thereby eliminates the shock hazard attendant an exposed synchronizing contact.

I claim:

1. In a camera including a pair of synchro seats each having first and second terminals for connecting to an electrical connector having an electrical potential thereon, a synchronizing switching mechanism adapted to short circuit the first terminals to the second terminal for each synchro seat, and a selector switch connectable to the first terminal of either synchro switch, the combination comprising:
   a shoe for supporting an electrically operated flash light device and having an aperture;
   a synchronizing contact supported adjacent to the aperture in the shoe and exposed for electrical contact with the flash light device; and
   a two-terminal switching device comprising a unilaterally conductive circuit element connected in series circuit relationship with the synchronizing contact and the selector switch for selectively preventing the electrical potential applied on one of said terminals by said electrical connector from reaching said synchronizing contact and thereby eliminate a shock hazard attendant the exposed synchronizing contact and for selectively conducting current during a flashing operation.

2. A combination according to claim 1 including a base mounting seat for mounting the shoe to the camera body.

3. In a camera including a pair of synchro seats each having first and second terminals for connecting to an electrical connector having an electrical potential thereon, a synchronizing switching mechanism adapted to short circuit the first terminals to the second terminal for each synchro seat, and a selector switch connectable to the first terminal of either synchro switch, the combination comprising:
   a shoe for supporting an electrically operated flash light device and having an aperture;
   a synchronizing contact supported adjacent to the aperture in the shoe and exposed for electrical contact with the flash light device; and
   a two-terminal switching device comprising a diode having its anode electrically coupled to the synchronizing circuit and its cathode electrically coupled to the selector switch for selectively preventing the electrical potential applied on one of said terminals by said electrical connector from reaching said synchronizing contact and thereby eliminate a shock hazard attendant the exposed synchronizing contact and for selectively conducting current during a flashing operation.

* * * * *